United States Patent
Lin

(10) Patent No.: US 9,652,007 B2
(45) Date of Patent: May 16, 2017

(54) VOLTAGE CONTROL CIRCUIT

(71) Applicant: Yi-Peng Lin, Taipei (TW)

(72) Inventor: Yi-Peng Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 330 days.

(21) Appl. No.: 14/453,608

(22) Filed: Aug. 6, 2014

(65) Prior Publication Data

US 2015/0046733 A1    Feb. 12, 2015

(30) Foreign Application Priority Data

Aug. 9, 2013   (TW) .................................. 102128706

(51) Int. Cl.
    *G06F 1/26* (2006.01)
    *G06F 1/32* (2006.01)

(52) U.S. Cl.
    CPC . *G06F 1/26* (2013.01); *G06F 1/32* (2013.01)

(58) Field of Classification Search
    CPC .............................. H02M 3/156; H02M 3/157
    See application file for complete search history.

(56) References Cited

U.S. PATENT DOCUMENTS

| | | | | |
|---|---|---|---|---|
| 2004/0046535 | A1* | 3/2004 | Duffy | .................. H02M 3/1584 323/283 |
| 2008/0239774 | A1* | 10/2008 | Canfield | ............. H02M 3/1588 363/127 |
| 2009/0284311 | A1 | 11/2009 | Ito | |
| 2012/0038334 | A1* | 2/2012 | Peng | .................. H02M 3/1588 323/282 |
| 2012/0091977 | A1* | 4/2012 | Carroll | ................ H02M 3/1584 323/271 |
| 2013/0141991 | A1 | 6/2013 | Solvin et al. | |
| 2013/0278205 | A1* | 10/2013 | Mullins | .................... G06F 21/44 320/107 |
| 2014/0082381 | A1* | 3/2014 | Dinh | ......................... G06F 1/26 713/300 |
| 2014/0354256 | A1* | 12/2014 | Li | ......................... H02M 3/156 323/283 |

FOREIGN PATENT DOCUMENTS

| | | |
|---|---|---|
| CN | 102163604 | 8/2011 |
| CN | 202042890 | 11/2011 |
| TW | 200744294 | 12/2007 |

* cited by examiner

*Primary Examiner* — Kim Huynh
*Assistant Examiner* — Brandon Kinsey
(74) *Attorney, Agent, or Firm* — Jianq Chyun IP Office

(57) ABSTRACT

A voltage control circuit includes a processing unit, a power control circuit, a first impedance circuit, a first switch, and a current source. The power control circuit is used for outputting a core voltage to the processing unit. The first switch and the first impedance circuit are connected in parallel between the processing unit and the power control circuit, and they feedback a feedback voltage to the power control circuit. The current source is used for providing or extracting an operating current via the first impedance circuit or the first switch. The first switch is turned on and the processing unit receives a first core voltage when the processing unit operates at a normal mode. The first switch is turned off and the processing unit receives a second core voltage when the processing unit operates at an overvoltage mode.

9 Claims, 4 Drawing Sheets

VOLTAGE CONTROL CIRCUIT

CROSS-REFERENCE TO RELATED APPLICATION

This application claims the priority benefit of Taiwan application serial No. 102128706, filed on Aug. 9, 2013. The entirety of the above-mentioned patent application is hereby incorporated by reference herein and made a part of specification.

BACKGROUND OF THE INVENTION

Field of the Invention

The invention relates to a circuit and, more particularly, to a voltage control circuit of a processing unit.

Description of the Related Art

Advanced graphic cards are usually installed in personal computers to get better visual effect while displaying three-dimensional (3D) images. The advanced graphic card usually equipped with an overclock function, and an overvoltage operation should be cooperated to meet higher requirements on power consumption when overclocking. The overvoltage operation is to raise a core voltage over its extreme limit of a central processing unit or a graphical processing unit of the graphic card.

A conventional graphic card includes a power control circuit to provide the core voltage to the CPU or a graphical processing unit of the graphic card is disclosed. Conventional power control circuit is an analog circuit with no overvoltage function, therefore, a periphery additional circuit to provide the overvoltage function is further added.

In recently years, the power control circuit is gradually developed from the analog circuit to the digital circuit, but the analog power control circuit is not appropriate to be adapted to the digital power control circuit directly.

BRIEF SUMMARY OF THE INVENTION

An overvoltage architecture of a digital power control circuit is provided.

A voltage control circuit includes a processing unit, a power control circuit, a first impedance circuit, a first switch, and a current source. The power control circuit is used for outputting a core voltage to the processing unit. The first switch and the first impedance circuit are connected in parallel between the processing unit and the power control circuit, and the first switch and the first impedance circuit provide a feedback voltage to the power control circuit. The current source is used for providing or extracting an operating current via the first impedance circuit or the first switch. The first switch is turned on and the processing unit receives a first core voltage when the processing unit operates at a normal mode. The first switch is turned off and the processing unit receives a second core voltage when the processing unit operates at an overvoltage mode.

The voltage control circuit may switch the flow path of the operating current to adjust the core voltage received by the processing unit. Therefore, the processing unit may receive the different core voltage at the different operating mode.

These and other features, aspects and advantages of the present invention will become better understood with regard to the following description, appended claims, and accompanying drawings.

DETAILED DESCRIPTION OF THE EMBODIMENTS

Figure 1:
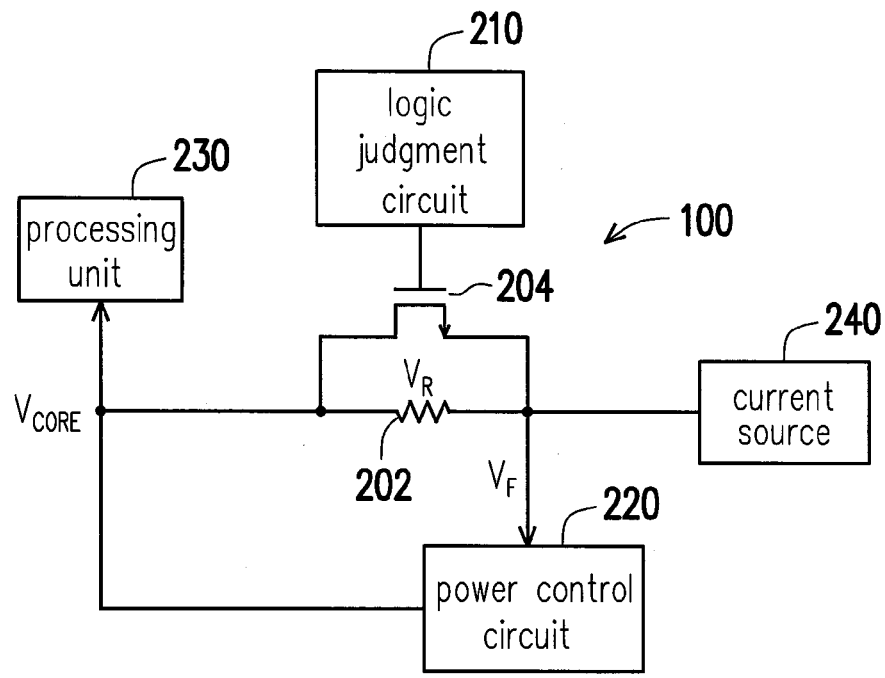
FIG. 1 is a schematic diagram of a voltage control circuit according to an embodiment.

FIG. 1 is a schematic diagram of a voltage control circuit 100 according to an embodiment. The voltage control circuit 100 may be a part of a graphic card of a PC. The voltage control circuit 100 includes an impedance circuit 202, a switch 204, a logic judgment circuit 210, a power control circuit 220, a processing unit 230, and a current source 240. The processing unit 230 may be a CPU or a graphic processing unit of the graphic card. The power control circuit 220 is a digital power control circuit.

The power control circuit 220 is coupled with the processing unit 230 for outputting a core voltage $V_{CORE}$ to the processing unit 230. The impedance circuit 202 and the switch 204 are connected in parallel between the processing unit 230 and the power control circuit 220, and the impedance circuit 202 and the switch 204 can provide a feedback voltage $V_F$ to the power control circuit 220. The current source 240 is coupled with the impedance circuit 202 and the switch 204 for providing or extracting an operation current via the impedance circuit 202 or the switch 204.

The impedance circuit 202 may be a single resistor or a combination of multiple resistors in the embodiment, it is represented by a single resistor in the figures herein.

The logic judgment circuit 210 is coupled with a control end of the switch 204. The switch in the embodiment is an N-channel metal-oxide-semiconductor field-effect transistor (an NMOS transistor), thus, the control end of the switch 204 is the gate of the NMOS transistor. The logic judgment circuit 210 may control the switch 204 to be turned on or turned off according to the operating mode of the processing unit 230, so as to switch the path of the operating current of the current source 240.

Figure 2:
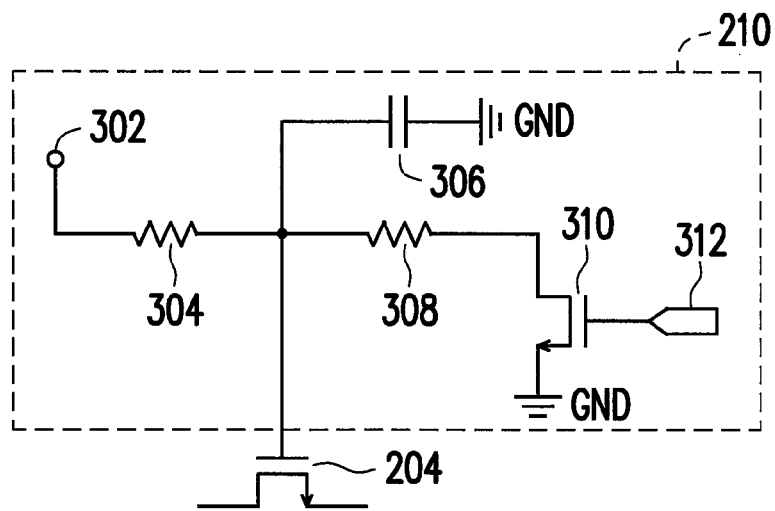
FIG. 2 is a schematic diagram of a logic judgment circuit according to an embodiment.

FIG. 2 is a schematic diagram of a logic judgment circuit 210 according to an embodiment. The logic judgment circuit 210 includes resistors 304, 308, a capacitor 306, and a switch 310. The resistor 304 is coupled between the power source 302 and the control end of the switch 204. The power source 302 may provide a 12V voltage, which is not limited herein. The capacitor 306 is coupled between the ground end GND and the control end of the switch 204. The switch 310 and the resistor 308 are connected in series between the ground end GND and the control end of the switch 204. A control end of the switch 310 receives a control signal 312, which turns on or turns off the switch 310 according to the operating mode of the processing unit 230.

In the embodiment, the processing unit 230 has at least two operating modes which are normal mode and overvoltage mode. The processing unit 230 is overclocking in the overvoltage mode.

Please refer to FIG. 1 and FIG. 2. At the normal mode, the control signal 312 is a 0V voltage signal, and thus the switch 310 is turned off. The current from the power source 302 flows through the resistor 304 and the capacitor 306 and then enters to the ground end GND. The capacitor 306 is charged and the voltage thereof increases, and thus the switch 204 is turned on. The operating current of the current source 240 flows through the switch 204. If the voltage generated by the switch 204 is negligible, the core voltage $V_{CORE}$ of the processing unit 230 is a first core voltage at the normal mode.

The feedback voltage $V_F$ of the power control circuit 220 is a constant value, and $V_F$ is 1V in the embodiment. The core voltage outputted by the power control circuit 220 is 1V, therefore, the core voltage $V_{CORE}$ (the first core voltage) of the processing unit 230 is also 1V. The resistor 304 and the capacitor 306 can delay the switch of the switch 204 at the normal mode to avoid that a surge appears in the core voltage $V_{CORE}$ of the processing unit 230.

When the processing unit operates at the overvoltage mode, the control signal 312 is a 3V voltage signal, and thus the switch 310 is conducted. The current from the power source 302 flows to the ground end GND via the resistors 304, 308 and the switch 310. Since the resistance of the resistor 304 is much greater than the resistance of the resistor 308, the connection point of the two resistors is low voltage and which turns off the switch 204. At the time, since the switch 204 is turned off, the current source 240 extracts the operating current and the operating current flows through the impedance circuit 202, the core voltage $V_{CORE}$ of the processing unit 230 is equal to the sum of the feedback voltage $V_F$ and the voltage difference $V_R$ which is generated by the impedance circuit 202.

The voltage outputted by the power control circuit 220 is 1.2V at the overvoltage mode, and the voltage is equal to the sum of the feedback voltage $V_F$ and the voltage difference $V_R$. That is to say, the core voltage of the processing unit 230 is a second core voltage at the overvoltage mode, and the second core voltage $V_{CORE}$ is greater than the feedback voltage $V_F$. The voltage difference $V_R$ is equal to the operating current extracted by the current source 240 multiply by the resistance of the impedance circuit 202. The resistor 308 and the capacitor 306 may delay the switch of the switch 204 at the overvoltage mode to avoid that a surge appears in the core voltage $V_{CORE}$.

Figure 3:
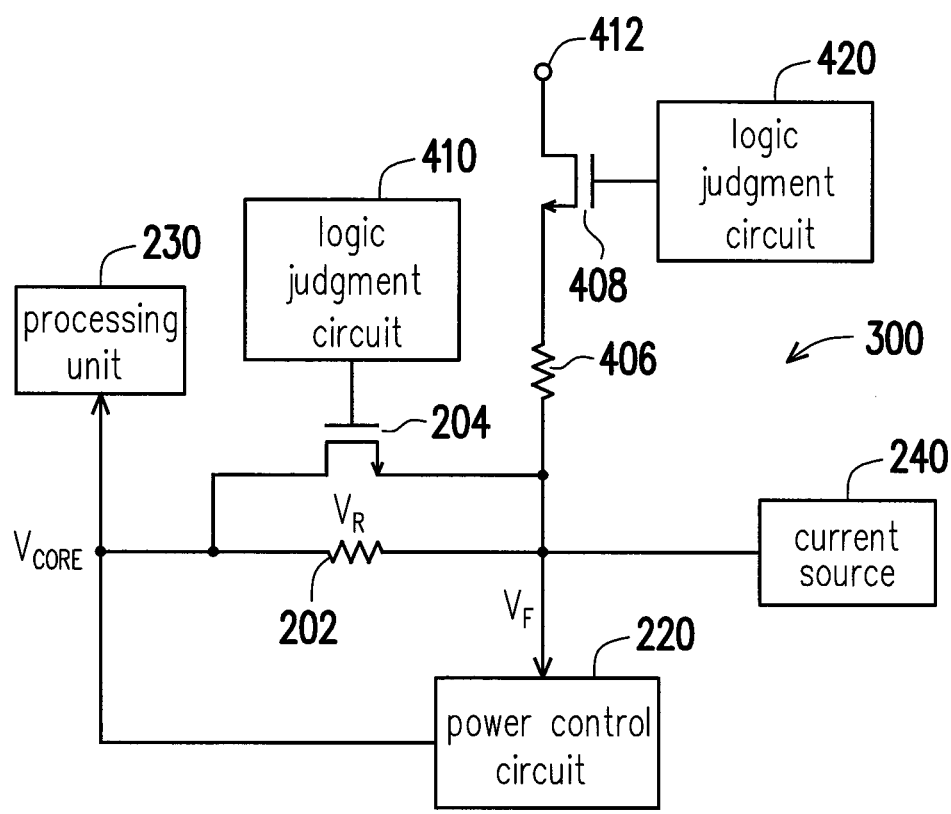
FIG. 3 is a schematic diagram of a voltage control circuit according to another embodiment.

FIG. 3 is a schematic diagram of a voltage control circuit 300 according to another embodiment. Compared with the voltage control circuit 100 of the aforementioned embodiment, in the voltage control circuit 300 in this embodiment, the logic judgment circuit 210 is replaced by a logic judgment circuit 410, and the voltage control circuit 300 further includes an impedance circuit 406, a switch 408, and a logic judgment circuit 420. The impedance circuit 406 is coupled with the switch 204, the impedance circuit 202, the power control circuit 220, and the current source 240. The switch 408 is coupled between the impedance circuit 406 and the power source 412.

The power source 412 may supply a 3.3V voltage, which is not limited herein. The logic judgment circuit 410 is coupled with the control end of the switch 204, and the logic judgment circuit 420 is coupled with the control end of the switch 408. The logic judgment circuit 410 controls the switch 204 to be turned on or off according the operating mode of the processing unit 230, and the logic judgment circuit 420 controls the switch 408 to be turned on or off according the operating mode of the processing unit.

Figure 4:
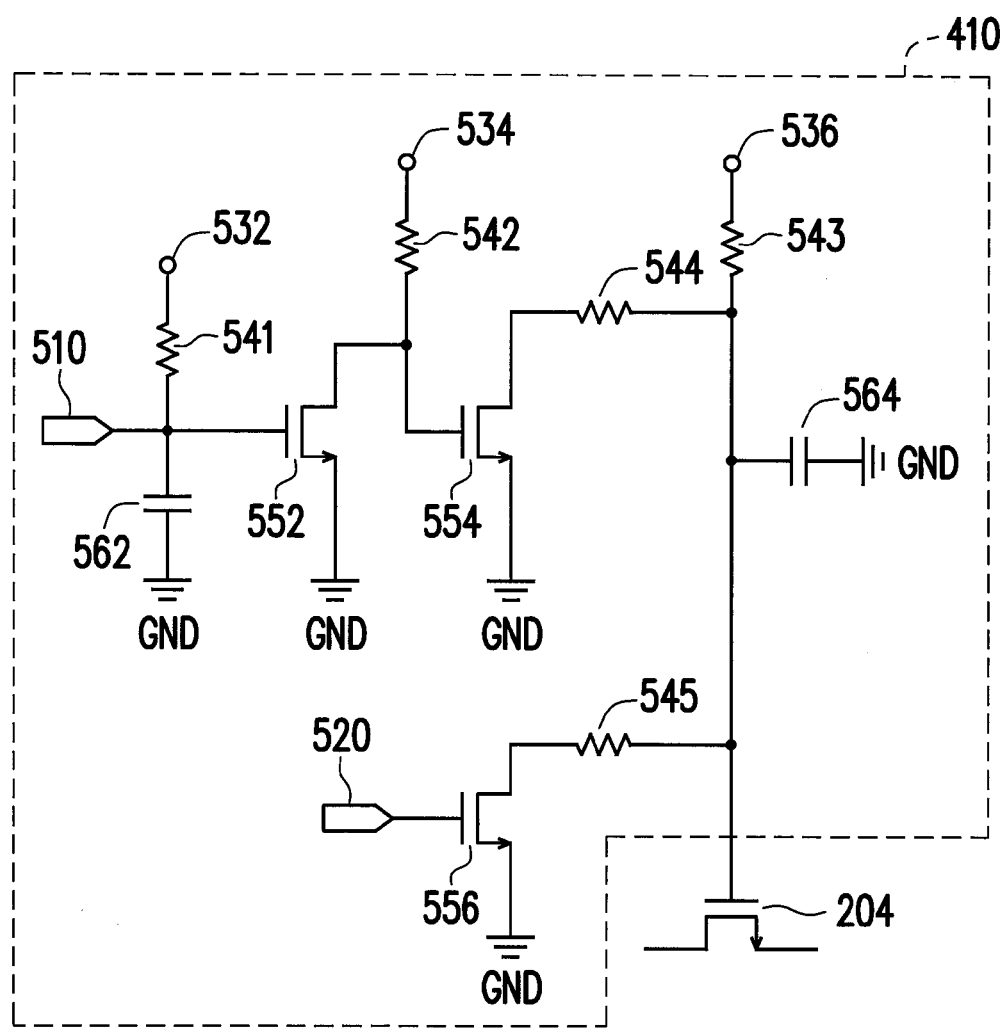
FIG. 4 is a schematic diagram of a logic judgment circuit according to another embodiment.

FIG. 4 is a schematic diagram of a logic judgment circuit 400 according to another embodiment. The logic judgment circuit 410 receives the control signals 510, 520, and it includes resistors 541 to 545, switches 552, 554, 556, and capacitors 562, 564. The power source 532, 534 may supply a 3.3V voltage, and the power source 536 may supply a 12V voltage, which is not limited herein.

Figure 5:
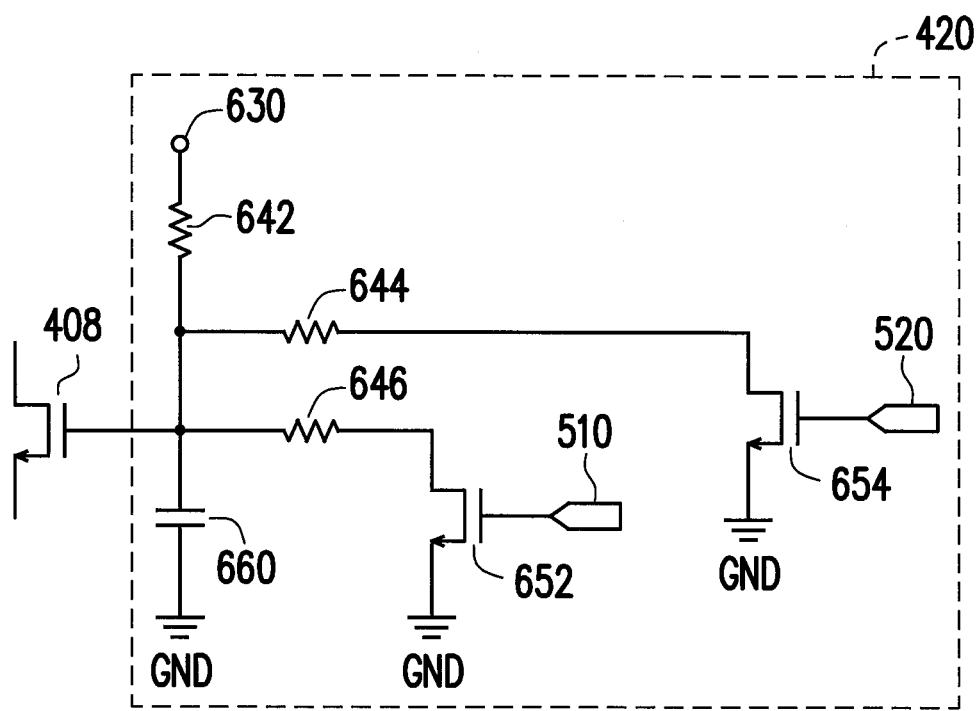
FIG. 5 is a schematic diagram of a logic judgment circuit according to further another embodiment.

FIG. 5 is a schematic diagram of a logic judgment circuit 420 according to further another embodiment. The logic judgment circuit 420 receives the control signals 510, 520, and it includes resistors 642, 644, 646, switches 652, 654, and a capacitor 660. The power source 630 may supply a 12V voltage, which is not limited herein.

In the embodiment, the processing unit 230 has three operating modes: the power saving mode, the normal mode, and the overvoltage mode. When the processing unit 230 is processing two-dimensional images, such as images of document processing software, the power saving mode is entered. The processing unit 230 enters the normal mode when it is processing 3-dimensional images, such as images of computer games. Further, the processing unit 230 enters the overvoltage mode when the processing unit 230 needs overclocking, for example, to display better 3-dimensional images.

Generally speaking, the core voltage $V_{CORE}$ needed by the processing unit 230 at the power saving mode is smaller than the feedback voltage $V_F$, the needed core voltage $V_{CORE}$ is equal to the feedback voltage $V_F$ at the normal mode, and the needed core voltage $V_{CORE}$ is greater than the feedback voltage $V_F$ at the overvoltage mode, and also greater than the needed core voltage at the normal mode.

The logic judgment circuits 410 and 420 receive the control signals 510 and 520. The control signal 510 controls whether to switch between the power saving mode and the normal mode, and the control signal 520 controls whether to overvoltage. The control signals 510 and 520 has different statuses under three operating modes to control the switches 204 and 408 via the logic judgment circuits 410 and 420, as shown in table 1.

TABLE 1

|  | power saving mode | normal mode | overvoltage mode |
|---|---|---|---|
| control signal 510 | de-asserted | asserted | asserted |
| control signal 520 | de-asserted | de-asserted | asserted |

The asserted status in table 1 refers that the corresponding control signal is a logic high voltage, such as 3V. The de-asserted status refers that the corresponding control signal is a logic low voltage, such as 0V. The corresponding voltage is not limited herein, and the asserted status and the de-asserted status can be set corresponding to different voltages.

The operation of the logic judgment circuit 410 will be described hereinafter, and please refer to FIG. 4. Both the control signals 510 and 520 are at the de-asserted status to turn off the switches 552 and 556 at the power saving mode. The switch 554 is turned on due to the high voltage of the power source 534. Since the resistance of the resistor 543 is much greater than the resistance of the resistor 544, the connection point of the two resistors is at a low voltage and which turns off the switch 204.

At the normal mode, the control signal 510 is asserted, the switch 552 is turned on, the control signal 520 is at the de-asserted status, and the switch 556 is turned off. The switch 552 connects the ground end GND to the control end of the switch 554 to make the switch 554 turned off. Therefore, the high voltage of the power source 536 turns on the switch 204.

At the overvoltage mode, the control signals 510 and 520 are asserted to make the switch 552 and 556 conducted. The conducted switch 552 connects the ground end GND to the control end of the switch 554 to turn off the switch 554.

Since the resistance of the resistor 543 is much greater than the resistance of the resistor 545, the connection point of the two resistors is at a low voltage which turns off the switch 204.

Please refer to FIG. 5, and the operation of the logic judgment circuit 420 will be described hereinafter. At the power saving mode, both the control signals 510 and 520 are at the de-asserted status to make the switches 652 and 654 turned off. The high voltage of the power source 630 turns on the switch 408.

At the normal mode, the control signal 510 is at the asserted status, the switch 652 is turned on, and the control signal 520 is at the de-asserted status which makes the switch 654 turned off. Since the resistance of the resistor 642 is much greater than the resistance of the resistor 646, the connection point of the two resistors is at a low voltage which makes the switch 408 turned off.

At the overvoltage mode, both the control signals 510 and 520 are at the asserted status to make the switches 652 and 654 turned on. Since the resistance of the resistor 642 is much greater than the resistance of the resistor 644 and the resistance of the resistor 646, the connection point of the three resistors is at a low voltage which makes the switch 408 turned off.

The resistors and the capacitors of the logic judgment circuits 410 and 420 can delay the switch of switches 204 and 408 to avoid that a surge appears in the core voltage VCORE.

The statuses of the control signals 510, 520 and the switch 204, 408 at each operating mode are shown in table 2 below.

TABLE 2

|  | power saving mode | normal mode | overvoltage mode |
| --- | --- | --- | --- |
| control signal 510 | de-asserted | asserted | asserted |
| control signal 520 | de-asserted | de-asserted | asserted |
| switch 204 | off | on | off |
| switch 408 | on | off | off |

Please refer to Table 2, FIG. 3, FIG. 4, and FIG. 5, and the operation of the voltage control circuit 300 will be described hereinafter. At the power saving mode, both the control signals 510 and 520 are at the de-asserted status, and thus the logic judgment circuit 410 controls the switch 204 to be turned off, and the logic judgment circuit 420 controls the switch 408 to be turned on. In the voltage control circuit 300 of FIG. 3, the current flows from the power source 412 through the switch 408, and the impedance circuits 406, 202. The voltage $V_R$ generated by the impedance circuit 202 makes the core voltage $V_{CORE}$ less than the feedback voltage $V_F$.

In other words, the core voltage $V_{CORE}$ at the power saving mode is equal to the feedback voltage $V_F$ subtracting the voltage difference $V_R$ generated by the impedance circuit 202. Thus, the voltage outputted by the power control circuit 220 is equal to the feedback voltage $V_F$ subtracting the voltage difference $V_R$. The voltage difference $V_R$ at the power saving mode is determined by the following formula, wherein $V_S$ is the voltage of the power source 412, $R_T$ is the resistance of the impedance circuit 406 and $R_B$ is the resistance of the impedance circuit 202.

$$V_R = (V_S - V_F)/R_T * R_B$$

At the normal mode, the control signal 510 is at the asserted status, the control signal 520 is at the de-asserted status, and thus the logic judgment circuit 410 controls the switch 204 to be turned on, and the logic judgment circuit 420 controls the switch 408 to be turned off. Therefore, the operation of the voltage control circuit 300 in FIG. 3 at the normal mode is the same as the operation of the voltage control circuit 100 in FIG. 1 at the normal mode. The core voltage $V_{CORE}$ of the processing unit 230 is equal to the feedback voltage $V_F$. Thus, the voltage outputted by the power control circuit 220 is equal to the feedback voltage $V_F$.

At the overvoltage mode, both the control signals 510 and 520 are at the asserted status, thus, the logic judgment circuit 410 controls the switch 204 to be turned off and the logic judgment circuit 420 controls the switch 408 to be turned off. Therefore, the operation of the voltage control circuit 300 at the overvoltage mode in FIG. 3 is the same as the operation of the voltage control circuit 100 at the overvoltage mode in FIG. 1. The core voltage $V_{CORE}$ of the processing unit 230 is equal to the sum of the feedback voltage $V_F$ and the voltage difference $V_R$ generated by the impedance circuit 202. Thus, the voltage outputted by the power control circuit 220 is equal to the sum of the feedback voltage $V_F$ and the voltage difference $V_R$.

In conclusion, the voltage control circuit automatically adjusts the core voltage according to the operating mode of the processing unit to provide different core voltages corresponding to the different operating modes of the processing unit, which meets the requirements of displaying different images, overclocking, and overvoltage requirements. As a result, an overvoltage architecture of the digital power control circuit is provided.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A voltage control circuit, comprising:
   a processing unit;
   a power control circuit, coupled with the processing unit for outputting a core voltage to the processing unit;
   a first impedance circuit;
   a first switch, wherein the first switch and the first impedance circuit are connected in parallel between the processing unit and the power control circuit, and the first switch and the first impedance circuit provide a feedback voltage to the power control circuit;
   a current source, coupled with the first impedance circuit and the first switch for providing or extracting an operating current via the first impedance circuit or the first switch;
   a second impedance circuit, coupled with the first switch, the first impedance circuit, the power control circuit, and the current source; and
   a second switch, coupled between the second impedance circuit and a power source;
   wherein the first switch is turned on, the second switch is turned off and the processing unit receives a first core voltage when the processing unit operates at a normal mode;
   the first switch is turned off, the second switch is turned off and the processing unit receives a second core voltage when the processing unit operates at an overvoltage mode;
   the first switch is turned off, the second switch is turned on and the core voltage of the processing unit is less than the feedback voltage when the processing unit operates at a power saving mode.

2. The voltage control circuit according to claim 1, wherein the feedback voltage is a constant value.

3. The voltage control circuit according to claim 1, wherein the second core voltage of the processing unit is equal to the sum of the feedback voltage and the voltage difference generated by the first impedance circuit when the processing unit operates at the overvoltage mode, the voltage difference is determined by the operating current and the resistance of the first impedance circuit, and the second core voltage is higher than the first core voltage.

4. The voltage control circuit according to claim 1, wherein the current source extracts the operating current via the first impedance circuit when the processing unit operates at the overvoltage mode.

5. The voltage control circuit according to claim 1, further comprising:
  a first logic judgment circuit, coupled with a control end of the first switch for controlling the first switch to be turned on or turned off according to that the processing unit operates at the normal mode or the overvoltage mode.

6. The voltage control circuit according to claim 5, wherein the first logic judgment circuit includes:
  a first resistor, coupled between a power source and the control end of the first switch;
  a capacitor, coupled between a ground end and the control end of the first switch;
  a second resistor; and
  a third switch, connected with the second resistor in series between the ground end and the control end of the first switch.

7. The voltage control circuit according to claim 6, wherein a control end of the third switch receives a control signal, the control signal makes the third switch turned off when the processing unit operates at the normal mode, and the control signal makes the third switch turned on when the processing unit operates at the overvoltage mode.

8. The voltage control circuit according to claim 1, wherein when the processing unit operates at the power saving mode, the core voltage of the processing unit is equal to the feedback voltage subtracting the voltage difference generated by the first impedance circuit, the voltage difference is determined by the voltage of the power source, the feedback voltage, the resistance of the first impedance circuit, and the resistance of the second impedance circuit.

9. The voltage control circuit according to claim 1, further comprising:
  a second logic judgment circuit, coupled with a control end of the second switch for controlling the second switch to be turned on or turned off according to the processing unit operates at the normal mode, the overvoltage mode, or the power saving mode.

* * * * *